Figure 1:
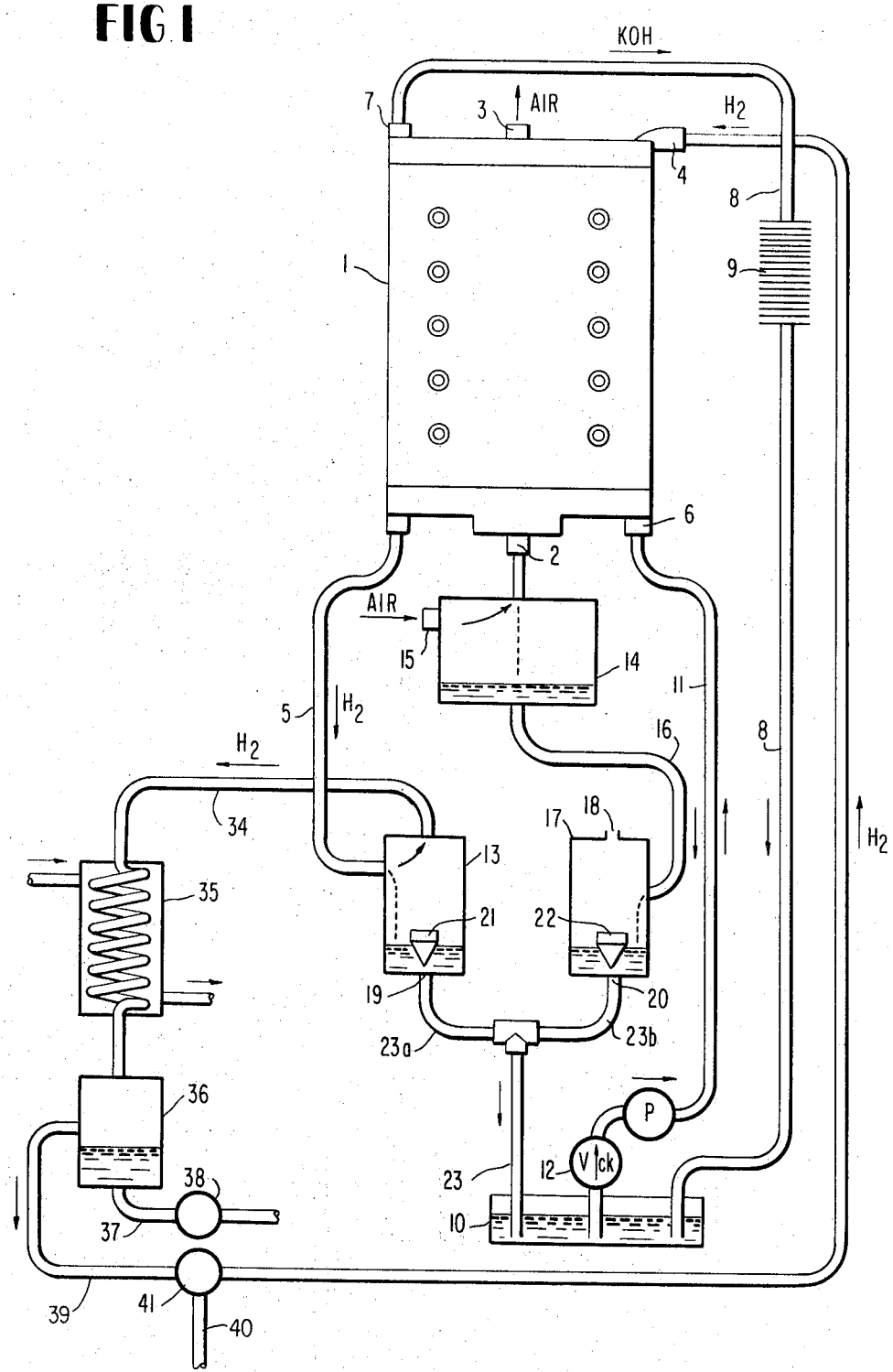

United States Patent [19]
Cheron

[11] 3,861,958
[45] Jan. 21, 1975

[54] PROCESS AND DEVICES FOR RECOVERING ELECTROLYTE LEAKS IN A FUEL CELL

[75] Inventor: Jacques Cheron, Versailles, France

[73] Assignee: Institut Francais du Petrole, Hauts-de-Seine, France

[22] Filed: June 15, 1972

[21] Appl. No.: 262,943

Related U.S. Application Data

[63] Continuation-in-part of Ser. No. 80,694, Oct. 14, 1970, abandoned.

[30] Foreign Application Priority Data
Oct. 17, 1969 France .............................. 69.35819

[52] U.S. Cl. .............................. 136/86 R, 136/86 B
[51] Int. Cl. .................... H01m 27/00, H01m 27/12
[58] Field of Search ................ 136/86 R, 86 E, 86 B

[56] References Cited
UNITED STATES PATENTS
3,462,308   8/1969   Winters .............................. 136/86 R
3,525,643   8/1970   Spahrbur et al. ................... 136/86 E Primary Examiner—Winston A. Douglas
Assistant Examiner—M. A. Feeley
Attorney, Agent, or Firm—Craig & Antonelli

[57] ABSTRACT

A process for the complete recovery of possible electrolyte leaks of a fuel cell fed with oxidizing and reducing gases comprising separately recovering the leaks from the respective circuits of said two gases, collecting said leaks while preventing any mixture of said gases and recycling to the cell the whole of said collected electrolyte leaks.

17 Claims, 2 Drawing Figures

PROCESS AND DEVICES FOR RECOVERING ELECTROLYTE LEAKS IN A FUEL CELL

This application is a continuation-in-part of U.S. application Ser, No. 80,694, filed Oct. 14, 1970 now abandoned.

This invention relates to a process for recovering liquid electrolyte leaks in a gas fuel cell, as well as to devices for performing this process.

Such leaks may occur as a result of an electrolyte flow in one or more compartments of the cell where the oxidizing gas (such as air) flows, or in one or more compartments of the cell through which passes the reducing gas (such as hydrogen). This electrolyte flow may result either from the perforation, often very small, of the layer for sealing the compartments from the electrolyte which covers each electrode or from a defective sealing at the level of the edges of at least one electrode for preventing diffusion of the electrolyte into the gas compartments, or still from an electrolyte perfusion through one or more electrodes due to any other phenomenon.

There results either electrolyte losses of the cell when the same has been provided with means for discharging said electrolyte leaks outside from the cell, however without the provision of means for recovering said leaks, or a defective feeding of the electrodes with gas, due to the electrolyte accumulation in the electrodes interspaces for feeding the cell with reducing or oxidizing gas, when discharge means for these electrolyte leaks to the outside of the cell have not been provided.

It is an object of this invention to avoid said drawbacks by providing a gas fuel cell which can be operated autonomously, continuously and indefinitely with the same electrolyte amount by recovery of the electrolyte flow in the gas circuits of the cell, avoiding, by this recovery, any loss or admixture of the oxidizing and reducing gases.

These objects are attained, according to this invention by a process for recovering liquid electrolyte leaks, from the compartments of a gas fuel cell which the oxidizing and reducing gases circulates comprising:

recovering separately from the circuit of the oxidizing gas and from the circuit of the reducing gas by using the sole action of gravity before the gases are introduced or recycled into the cell, exclusively the electrolyte having flowed by gravity from each of said circuits to the bottom of the cell, collecting the so recovered electrolyte amounts from both circuits while keeping apart, without possibility of admixture, the oxidizing gas and the reducing gas, and recycling to the cell the so-collected electrolyte by adding the same to the main electrolyte circuit.

Figure 2:
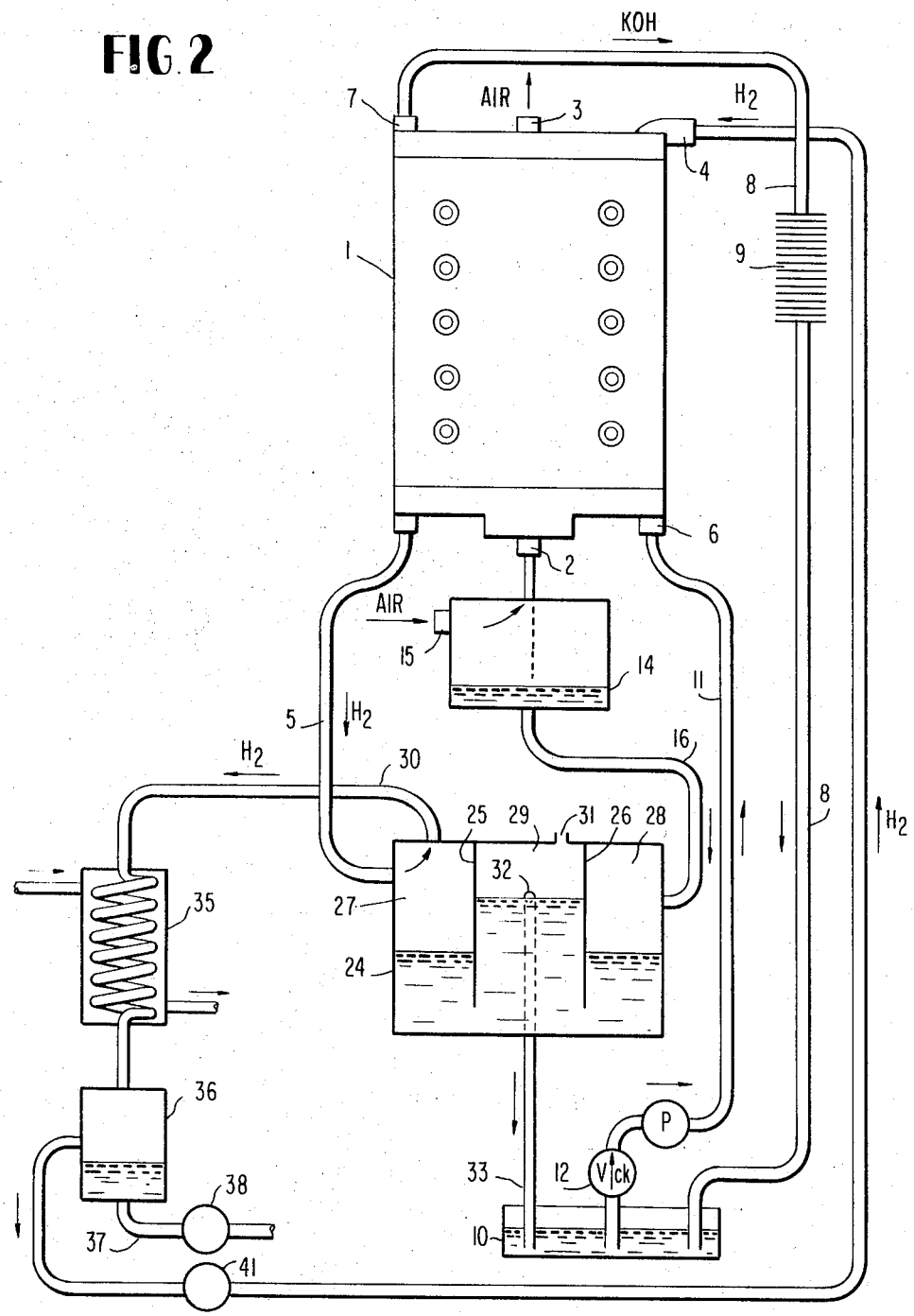

The invention will be now described more in detail in the following description of illustrative embodiments thereof, given by way of example and with reference to the accompanying drawings wherein:

FIG. 1 diagrammatically shows a first embodiment of the device according to the invention, and FIG. 2 illustrates a second embodiment for performing the process of the invention.

In both figures the same reference indicate similar elements.

The gas fuel cell, indicated generally by reference 1, is fed with air introduced through duct 2 and discharged from the air compartments of the cell through duct 3, said air being optionally recycled, at least partly with fresh air make-up. The hydrogen, introduced through duct 4, is discharged from the hydrogen compartments of the cell through duct 5 and then recycled, after intermediate cooling, while an electrolyte such as a solution of potassium hydroxide (KOH) is supplied to the cell through duct 6 and discharged therefrom through outlet 7.

At the outlet of the cell, the electrolyte conveyed by pipe 8 flows through the cooling unit 9 and is then recovered in the tank 10 from which it is recycled to the cell through any suitable means, for example a pump P provided with non-return valve 12, said recycling being effected via pipe 11 connected to the inlet duct 6.

Hydrogen and water vapor issuing from the cell through pipe 5 may carry along therewith some liquid electrolyte which, according to the device of the invention is recovered by passage through a chamber 13 where the electrolyte is separated from hydrogen and water vapor by the sole action of gravity. Then the mixture of hydrogen and water vapor flows upwardly through the chamber 13 (e.g. in the opposite direction of the action of the gravity) the pipe 34 the condenser 35 for removing water vapor carried by hydrogen. Reservoir 36 is conveniently provided for collecting condensed vapor. A pipe 37 and a valve 38 are provided for periodically purging water from reservoir 36. Hydrogen is then recycled into the cell by flowing through pipe 39 to pipe 4.

A complementary amount of hydrogen may be introduced in pipe 39 by a pipe 40 and valve 41.

The recovered electrolyte is collected at the bottom of chamber 13. Similarly, the air passing through the cell may carry along therewith some electrolyte, but as a result of the selected design in the illustrated embodiment wherein the air flows upwardly through the cell (e.g. in the opposite direction of the action of the gravity), the electrolyte present in the air compartment streams down along the walls of duct by the sole action of gravity and can be recovered in container 14 connected at its upper part with duct 2 and provided with an air inlet duct 15.

Of course a downward circulation of the air may also be chosen without departing from the scope of the invention, the air and water vapor flowing in the container 14 in the opposite direction of the action of the gravity, so that the liquid electrolyte leaks are collected in the container 14 without condensation of water vapor.

Means, not illustrated on the figures, can be used for recycling at least partly the air, and comprising as for the hydrogen recycling circuit a condenser for removing water vapor contained in the air after the electrolyte has been collected in the container 14.

The electrolyte recovered in container 14 flows down, through pipe 16, to chamber 17 which can be open to atmosphere by duct 18 at its upper part and is collected at the lower part of said chamber 17.

The electrolyte recovered in chambers 13 and 17 may flow from orifices 19 and 20 provided at the bottom of each chamber, respectively, through pipes 23a and 23b which both open into a common pipe 23 from where it is discharged to the electrolyte tank 10.

The opening of orifices 19 and 20 is controlled by valves 21 and 22 respectively consisting of floats which are lifted by the electrolyte and thereby disengaged from the orifices, leaving a free passage to the electrolyte towards pipe 23. The gases contained in chambers 13 and 17 cannot escape through orifices 19 and 20 which are obturated by the floats 21 and 23 when chambers 13 and 17 become empty.

The floats being no longer lifted by the liquid, again obturate the orifices 19 and 20.

This device avoids the electrolyte leaks due to the carrying away thereof by a gas. Accordingly the cell does not suffer from any electrolyte leak and therefore becomes autonomous and may work indefinitely with a constant electrolyte amount.

In the embodiment illustrated in FIG. 2, the two chambers 13 and 17 may be replaced by a single tank 24, divided into three compartments 27, 28 and 29 by means of vertical partitions 25 and 26 leaving the three compartments in free communication at their lower part.

Compartments 27 and 29 are open at their top by ports 30 and 31 respectively. Pipes 5 and 16 open respectively in the upper part of the lateral wall of compartments 27 and 28 of tank 24 and the recovered electrolyte issuing from these pipes raises in each compartment of tank 24, up to a level which depends on the pressure of the gas in contact with the electrolyte at the upper part of said compartment.

The central compartment 29 of the tank, wherein is collected the recovered electrolyte, is provided with an overflow orifice 32 through which the electrolyte flows towards the electrolyte tank 10 through pipe 33.

It must be observed that in the embodiment illustrated in FIG. 2 the electrolyte is also used as separating agent between the gaseous phases respectively contained in the three compartments of tank 24.

Both devices for recovering the electrolyte leaks shown respectively in FIGS. 1 and 2 offer the advantage of requiring no energy consumption for effecting this recovery. As a matter of fact, chambers 13 and 17 (FIG. 1) as well as tank 24 (FIG. 2) are placed below the cell 1 and above the electrolyte tank 10 so that the electrolyte can flow through the pipes by mere gravity.

Such an arrangement, although advantageous, is however not absolutely necessary and it could also be possible to place the tank 10 at the same level as or even above the recovery chambers, by adapting on pipe 23 (FIG. 1) or pipe 33 (FIG. 2) a pump, the energy consumption of which would remain low in view of the small rate of the leaks of electrolyte to be recovered.

It could be also possible, without departing from the scope of the invention to omit the tank 10 in the embodiment of FIG. 2 by connecting the electrolyte recycling duct 8 directly to compartment 29, all the electrolyte being then recycled to the cell from this compartment through the intermediary of pump P which in this case would be connected to this compartment of tank 24.

What I claim as this invention is:

1. In a process for recovering liquid electrolyte leaks from a gas fuel cell system of the type including a gas fuel cell having a main electrolyte circuit through which electrolyte passes through said gas fuel cell, two gas compartments positioned in said gas fuel cell and normally sealed from the main electrolyte circuit, means connected to said gas compartments for flowing therethrough corresponding gas streams, including a reducing gas stream and an oxidizing gas stream, respectively, which from an outlet of the two gas compartments carry water vapor produced by chemical reactions in the gas fuel cell, wherein the water vapor is removed by condensation from at least one of the two gas streams, said gas streams being subsequently recycled into the corresponding gas compartment of the fuel cell, and wherein electrolyte leaks from the electrolyte circuit into respective gas compartments, the process comprising the steps of:

recovering separately said electrolyte leaks from the reducing gas stream and from the oxidizing gas stream by using the sole action of gravity, prior to said condensing the water vapor, such that any dilution of said electrolyte leaks by the condensed water vapor is prevented, collecting the so recovered undiluted electrolyte amounts from both gas streams while keeping apart, without possibility of admixture, the reducing gas stream and the oxidizing gas stream, and recycling to the main electrolyte circuit of the fuel cell the so collected electrolyte by adding the same to the main electrolyte circuit.

2. A process according to claim 1, wherein at least one of the gases flows upwardly through the cell, and said step of recovering comprising recovering at the lower part of the cell the flow, under the sole action of gravity, of the electrolyte from at least one of the cell compartments fed with said gas.

3. A gas fuel cell system comprising a gas fuel cell having electrolyte recycling means connected to said gas fuel cell for recycling electrolyte through said gas fuel cell, two gas compartments positioned in said gas fuel cell and normally sealed from the electrolyte recycled through said gas fuel cell, means connected to said two gas compartments for flowing therethrough corresponding gas streams comprising respectively a reducing gas stream and an oxidizing gas stream which from an outlet of respective ones of said two gas compartments carry water vapor produced by chemical reactions in the gas fuel cell, condensing means connected to the outlet of at least one of said gas compartments for removing water vapor produced by chemical reactions in the gas fuel cell from the corresponding gas stream, means connected to said condensing means and to an inlet of at least one said gas compartment for recycling the corresponding gas stream thereinto after removing the water vapor, and electrolyte recovery means for recovering liquid electrolyte leaks into said gas compartments, said electrolyte leaks being carried along by at least one of the two gas streams from said outlet of the two gas compartments, said electrolyte recovery means comprising two recovery chambers corresponding to said two gas streams respectively for separately recovering by the sole action of gravity the electrolyte leaks from the reducing gas stream and from the oxidizing gas stream, said recovery chambers being respectively connected to the bottom of said gas compartments and being connected at their lower part to said electrolyte recycling means, said recovery chambers being each provided with means for preventing any loss of the gas stream passing through the chamber, wherein said means for condensing the water vapor are located downstream of and connected to the electrolyte recovery means in the flow of the corresponding gas stream.

4. A device according to claim 3, wherein the oxidizing gas and the reducing gas flow through said chambers for recovering electrolyte leaks in the opposite direction to the action of the gravity.

5. A device according to claim 4, wherein said electrolyte recovery chambers comprise a chamber for recovering the electrolyte from the oxidizing gas stream and a chamber for recovering the electrolyte from the reducing gas stream, said chambers being distinct.

6. A device according to claim 5 wherein each of said two chambers is provided at its lower part with an outlet port for the electrolyte, the opening of which is controlled by a valve consisting of a float adapted to be lifted by the electrolyte.

7. A device according to claim 4 wherein said electrolyte recovery chambers comprise a chamber for recovering the electrolyte from the oxidizing gas stream and a chamber for recovering the electrolyte from the reducing gas stream, said two chambers communicating at their lower end with a compartment of liquid separation, provided with a discharge orifice for the electrolyte placed above the level of communication of this compartment with the two chambers.

8. A device according to claim 4 wherein said connection between the recovery chambers and the electrolyte recycling means is achieved by means of an intermediate electrolyte tank placed below said recovery chambers, so that the recovered electrolyte can flow by gravity towards this electrolyte tank.

9. A device according to claim 7 wherein said compartment of liquid separation is directly connected to said electrolyte recycling means.

10. A device according to claim 7 wherein said compartment of liquid separation is connected to said electrolyte recycling means through the intermediary of an electrolyte tank placed below said compartment and connected therewith through an overflow duct.

11. A gas fuel cell system comprising:
at least one gas fuel cell of the type having at least a first gas compartment through which passes an oxidizing gas stream and at least a second gas compartment through which passes a reducing gas stream,
recycling means for recycling electrolyte through said gas fuel cell, said first and second gas compartment being normally sealed from said electrolyte,
condensing means for removing water vapor formed by chemical reactions in said gas fuel cell from at least one of said reducing gas streams and said oxidizing gas streams, and
leakage electrolyte recovery means for recovering electrolyte leaks within said gas fuel cell into said first and second gas compartments, said leakage electrolyte recovery means being connected downstream of said gas fuel cell and upstream of said condensing means in the gas stream.

12. A gas fuel cell system according to claim 11, wherein said leakage electrolyte recovery means comprise recovery chambers in each of said reducing gas stream and said oxidizing gas stream, said reducing gas stream and said oxidizing gas stream passing through respective recovery chambers.

13. A gas fuel cell system according to claim 12, wherein said recovery chambers are connected to said recycling means so that the leakage electrolyte is recycled through said gas fuel cell.

14. A gas fuel system according to claim 13, wherein means are provided for preventing loss of respective gas streams passing through said respective recovery chambers.

15. A gas fuel system according to claim 13, wherein said recovery chambers are arranged between said gas fuel cell and said recycling means to pass leakage electrolyte from said gas fuel cell to said recycling means.

16. A gas fuel system according to claim 15, wherein said leakage electrolyte is recovered in said leakage electrolyte recovery means by the sole action of gravity.

17. A gas fuel system according to claim 11, wherein said leakage electrolyte is recovered in said leakage electrolyte recovery means by the sole action of gravity.

* * * * *